B. F. WILSON.
SHOCK LOADER.
APPLICATION FILED MAR. 20, 1908.
934,587.
Patented Sept. 21, 1909.
2 SHEETS—SHEET 1.
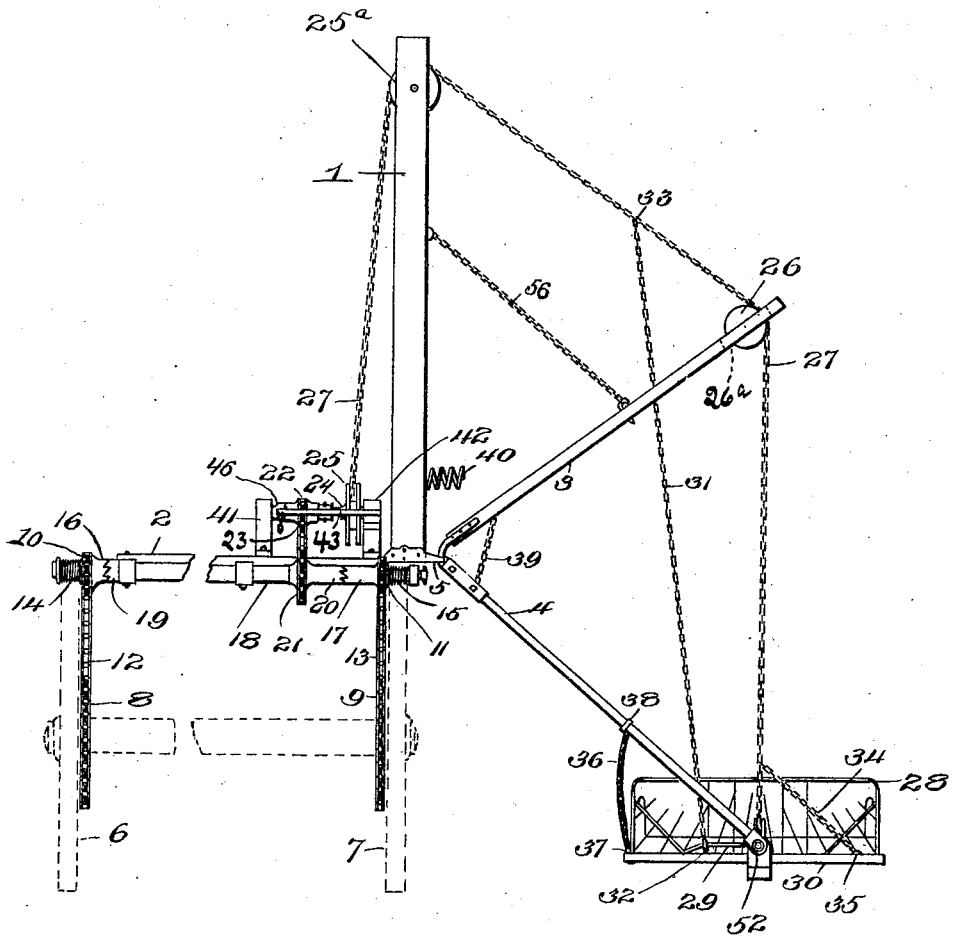
Witnesses
J. L. Richmond
J. A. Johnson
Inventor
Benjamin F. Wilson
By Mason Fenwick Lawrence
Attorneys

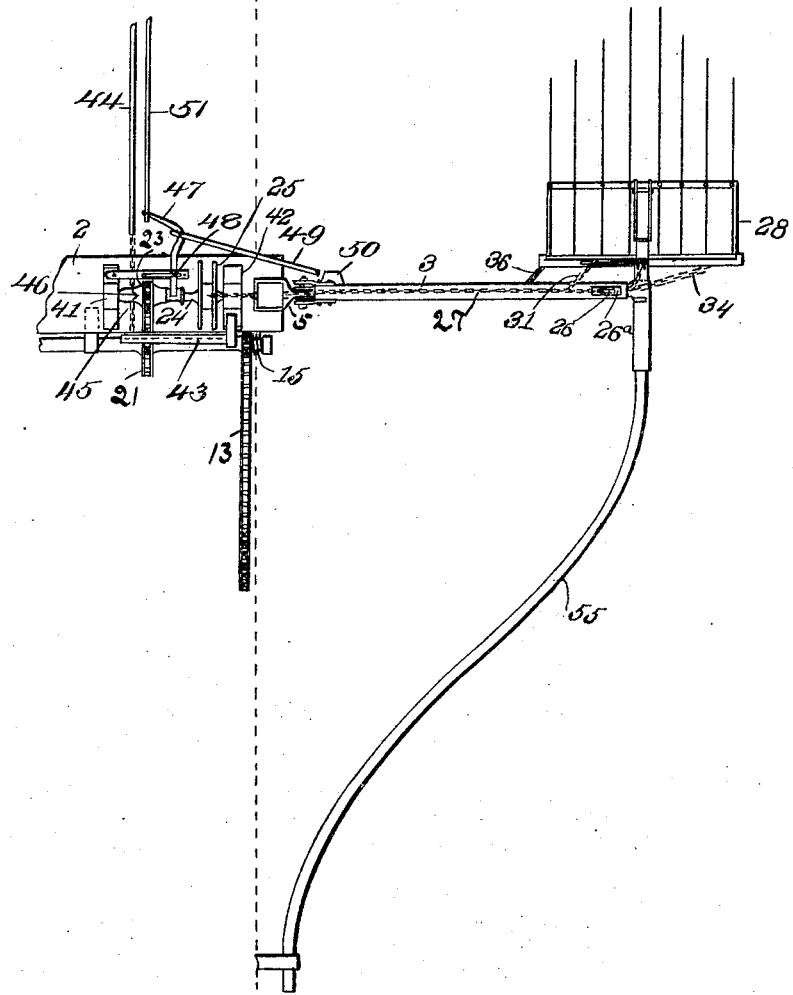

UNITED STATES PATENT OFFICE.

BENJAMIN F. WILSON, OF HASTINGS, NEBRASKA.

SHOCK-LOADER.

934,587.

Specification of Letters Patent.   Patented Sept. 21, 1909.

Application filed March 20, 1908.   Serial No. 422,365.

*To all whom it may concern:*

Be it known that I, BENJAMIN F. WILSON, a citizen of the United States, residing at Hastings, in the county of Adams and State of Nebraska, have invented certain new and useful Improvements in Shock-Loaders; and I do hereby declare the following to be a full, clear, and exact description of the invention, such as will enable others skilled in the art to which it appertains to make and use the same.

This invention relates to shock loaders.

The object of the invention is to provide a device by means of which shocks of hay or grain may be loaded directly onto a wagon without stopping the latter.

A further object is to provide means whereby the shocks may be raised by apparatus under the control of the driver who will not be required to leave his seat on the wagon during any part of the operation.

A still further object is to provide means for automatically returning the fork or carrier to its operative position after it has discharged a shock upon the wagon.

With these and other objects in view the invention consists in mounting upon a wagon body a suitable upright and in pivotally mounting at a point near the base of said upright two swinging arms, one of which is provided with a pulley and the other of which carries a pivoted carrier for raising the shocks and discharging them upon the wagon.

The invention consists further in providing means for raising the two pivoted arms above mentioned and for automatically tilting the carrier.

In the accompanying drawings: Figure 1 is an elevation showing my improved shock loader in operative position. Fig. 2 is a top plan view.

In carrying out my invention I affix an upright 1 in any suitable manner to one of the portions 2 of the framework of the wagon or hay rack, and pivotally secure arms 3 and 4 to a bracket 5 mounted on the lower portion of the upright 1. The wheels of the wagon or rack are indicated by the numerals 6 and 7, these wheels communicating motion to the sprocket wheels 8 and 9 which serve to drive the mechanism for raising the carrier. Sprocket wheels 10 and 11 are driven by means of chains 12 and 13 carried by the sprocket wheels 8 and 9, these wheels 10 and 11 being slidably mounted and normally pressed inward by means of coiled springs 14 and 15. Connected with the sprocket wheels 10 and 11 are toothed collars 16 and 17 loosely carried by a main shaft 18 on which latter are mounted fixed collars 19 and 20 also provided with teeth for engaging the teeth of the collars previously mentioned. Shaft 18 carries a sprocket wheel 21 driving a chain 22 which in turn engages the sprocket wheel 23 carried by short shaft 24 designed to drive the pulley 25.

A pulley $25^a$ is mounted in a recess $26^a$ in the upper end of member 1, and a similar pulley 26 is mounted in a recess in the arm 3. A chain 27 is connected with the pulley 25, passes over pulley $25^a$, thence over pulley 26, and is connected with the carrier 28, at its pivotal point. A brace 29 is secured to the cross bar 30 of the carrier and connected with such brace 29 is a chain 31 provided with a ring 32 sliding on the brace. Chain 31 also connects with chain 27 at the point 33 between the upright and arm 3 when the latter is in its lowered position as shown in Fig. 1. A short chain 34 connects the chain 27 with the right-hand side of the carrier at 35, and a connecting device 36 is secured at 37 to the opposite side of the carrier and to the arm 4 at the point 38. A short chain 39 connects arms 3 and 4 near their inner ends to prevent them from spreading beyond a given extent, and a chain 56 connects arm 3 and upright 1.

Mounted upon the upright 1 is a spring 40 with which arm 3 is designed to contact when it is raised to a nearly vertical position, and to assist in returning the arm to its lowered position when the chain 27 is freed in the manner hereafter described. A shaft 24 is mounted in boxes 41 and 42, and to one of these boxes is pivotally secured a member 43 designed to act as a brake upon pulley 25, this brake being operated by means of a rod 44 connected with brake member 43 by chain 45. A clutch 46 causes sprocket wheel 23 to drive shaft 24, such clutch being operated by means of a lever 47 pivoted at 48. A rod 49 connects with the lever 47 and is operated automatically by a device 50 on the arm 3 when the latter is brought to the proper position for the dumping of the carrier. Lever 47 is also connected with an arm 51 which is under the control of the driver and may be operated by him when desired.

The several parts being in the position shown in Fig. 1, a shock of hay or grain is caught upon the carrier and the clutch is thrown into operative position by the driver, the pulley 25 being thereby set in motion for the purpose of winding the chains 27 and 31. As the arm 4 is raised to a given height, it is brought into contact with arm 3 and the two arms are then raised together into an approximately vertical position. During this movement the chain 36 at the inner end of the carrier first becomes slack and later as the arms approach their vertical position this chain becomes taut. The carrier is pivoted at the point 52 and is braced at its outer end by the chain 34 as previously stated. When the chain 36 connecting the carrier with arm 4 becomes taut, the carrier will tilt slightly and the ring 32 will slide on the brace 29 toward the pivot 52. As the arms are further raised, the carrier is dumped, discharging its load upon the wagon. At this stage of the operation the disengaging device 50 comes in contact with arm 49 throwing the clutch out and releasing the chain wound upon pulley 25. The spring 40 then causes the arms to be thrown outward in order that they may return to the position shown in Fig. 1.

Arm 55 is secured to the body of the wagon or hay rack (the location of which is indicated by the dotted line), is attached to the carrier, and serves to guide the latter while it is being raised and lowered.

What I claim as new and desire to secure by Letters Patent, is—

1. In a shock loader, in combination, a vehicle for receiving the shocks, an arm connected with the vehicle and arranged to swing vertically, a carrier at the end of the arm, a chain for swinging the arm, means connected with said arm and with the carrier for tipping the carrier when the arm is swung to a predetermined position, and chains connected with the chain first mentioned and with the carrier on each side of its pivotal point for holding the carrier in its normal position when lowered.

2. In a shock loader, a vehicle for receiving the shocks, an upright secured thereto, a plurality of arms pivoted at the base of the upright, a pulley at the end of the upright, a pulley mounted at the end of one of the arms, a carrier pivoted to the end of the remaining arm, a chain connected with the carrier near its pivotal point, said chain passing over each of said pulleys, means for winding the opposite end of the chain, a second chain connected with the chain first mentioned approximately midway of its length and with the carrier at one side of its pivotal point, a third chain connected with the chain first mentioned and with the carrier on the other side of its pivotal point, and means connected with the arm last mentioned for preventing one end of the carrier from assuming an elevation equal to that of the opposite end when the arms have been brought to their highest point.

3. In a shock loader, a vehicle for receiving the shocks, an upright secured thereto, a plurality of arms pivoted at the base of the upright, a pulley mounted at the end of the upright, a second pulley at the outer end of one of the arms, a carrier pivoted to the end of the remaining arm, a chain connected with the carrier near its pivotal point, said chain passing over each of said pulleys, means for winding the opposite end of the chain, a second chain connected with the chain first mentioned approximately midway of its length and with the carrier at one side of its pivotal point, a third chain connected with the chain first mentioned and with the carrier on the other side of its pivotal point, and means connected with the arm last mentioned for preventing one end of the carrier from assuming an elevation equal to that of the opposite end when the arms have been brought to their highest point, means for automatically disconnecting the winding mechanism, and a spring for causing the arms to return to their lowered position.

In testimony whereof I have signed my name to this specification in the presence of two subscribing witnesses.

BENJAMIN F. WILSON.

Witnesses:
A. J. CHAMBERLAIN,
JOHN M. NORTON.